Patented Apr. 21, 1931

1,801,743

UNITED STATES PATENT OFFICE

GEORGE W. HEISE, OF LAKEWOOD, OHIO, ASSIGNOR TO NATIONAL CARBON COMPANY, INC., A CORPORATION OF NEW YORK

METHOD OF PREPARING DEPOLARIZING MIXTURES

No Drawing.   Application filed October 10, 1927.   Serial No. 225,404.

This invention is a method of producing a depolarizing composition for electric battery cells, comprising particles of manganese dioxide superficially coated with highly conductive carbon.

A method of preparing such a depolarizing mixture is described and claimed in Patent No. 1,553,530 granted to me on September 15, 1925.

The present invention is another method of attaining the desired comminution both of the final mix, and of the constituents of that mix, and of insuring a sufficient degree of interaction of the two constituents to thoroughly coat the manganese dioxide particles with a layer of conducting carbon.

In accordance with my invention I use a multi-stage process of milling preferably employing a plurality of mills arranged to operate in series so that the entire milling operation may be continuous with a definite stage of the milling carried out in each separate mill. The composition of the mix may vary at various stages of the milling process, and the material milled in the first stage may be a mix having a low ratio of manganese to carbon and hence containing only a small part of the requisite amount of manganese dioxide for the final mix. In this case the manganese-to-carbon ratio is increased during the milling operation by adding manganese or mixtures rich in manganese which have not been previously intermilled.

I prefer to start the milling with a mix composed of approximately equal parts of manganese dioxide and carbon, adding fractions of manganese ore at various stages of the milling process until a composition is obtained having a manganese-to-carbon ratio of approximately 3:1. In this manner the requisite quantity of very fine carbon is produced in the early stages of milling the low ratio mix and undue comminution of the manganese is avoided by adding the greater part of this material toward the end of the milling process. When all the materials have been added, milling is continued until an intimate mixture results and the particles of manganese dioxide are superficially coated with carbon.

It has been found advantageous at times to begin the milling with a mix having approximately the same ratio of manganese dioxide to carbon as is desired in the final mix, making subsequent additions of the same mix, not previously intermilled, during the milling process. In this manner a constant mix ratio is maintained and the relative milling rates of the mix components are controlled by varying the milling conditions in each separate stage of the series.

The composition of the original mix and the number of milling stages required may vary considerably depending upon the nature of the carbonaceous material and manganese dioxide used, since some forms of both these materials are much more friable than others and will consequently require different milling conditions to obtain the proper relative fineness of the two materials.

The ratio of manganese dioxide to carbon in the final mixture may vary considerably depending on the type of service for which the cells made therefrom are to be used and depending also on the kind of carbon and the grade of manganese used. The determination of this ratio forms no part of the present invention, which is applicable in the preparation of mix of any ratio. In present practice the ratio may vary from 2:1 or less to 3:1 or more.

I claim:

1. A method of preparing a battery depolarizing mixture which comprises milling a mixture containing carbon and manganese dioxide, the ratio of the latter to the carbon being less than 3:1, adding manganese dioxide substantially similar in physical characteristics to that of the original mix to the partially milled mixture until the manganese-dioxide-to-carbon ratio is approximately 3:1, and milling the whole.

2. A method of preparing a battery depolarizing mixture which comprises milling a mixture containing approximately equal weights of manganese dioxide and carbon, adding manganese dioxide substantially similar in physical characteristics to that of the original mix to the partially milled mixture until the manganese-dioxide-to-carbon ratio is approximately 3:1, and milling the whole.

3. A method of preparing a battery depolarizing mixture which comprises milling together in a plurality of successive milling stages carbon and manganese dioxide, the ratio of the latter to the carbon being less than 3:1, adding manganese dioxide substantially similar in physical characteristics to that of the original mix at successive stages to the partially milled mixture until the manganese-dioxide-to-carbon ratio is approximately 3:1, and milling the whole.

4. A method of preparing a battery depolarizing mixture which comprises milling a mixture containing approximately equal weights of manganese dioxide and carbon in a plurality of successive milling stages, adding unmilled manganese dioxide at successive stages to the partially milled mixture until the manganese-dioxide-to-carbon ratio is approximately 3:1, and milling the whole.

In testimony whereof, I affix my signature.

GEORGE W. HEISE.